Patented Mar. 7, 1939

2,149,914

UNITED STATES PATENT OFFICE 2,149,914

COATING COMPOSITIONS

Oswald H. Greager and Gordon D. Patterson, Wilmington, Del., assignors to E. I. du Pont de Nemours & Company, Wilmington, Del., a corporation of Delaware No Drawing. Application May 15, 1935, Serial No. 21,692

12 Claims. (Cl. 134—39)

This invention relates to coating compositions, and more particularly to rust-inhibitive priming compositions for ferrous metal surfaces.

The rust-inhibitive lead pigments are well known to the art and these pigments have been widely used in anticorrosive priming compositions. Such pigments, however, are expensive and possess undesirable settling and caking tendencies in ready mixed paints. The use of auxiliary pigments, in efforts to minimize or overcome these defects, has been held to a minimum in quality products because of the definite lowering in anticorrosive efficiency resulting therefrom. Certain fibrous extender pigments, for example, which have the valuable property of retarding settling in the can, are considered adulterants if employed in amounts exceeding relatively small percentages of the total pigment because of their deleterious effect on the quality of the product. Tests have shown that replacement of half the red lead in a paint by fibrous magnesium silicate, a commonly used anti-settler, markedly reduces the corrosion resistance of that system. Other cheap extenders in ordinary use, such as china clay, have the same effect.

This invention has as its object the production of new and useful metal protective paints. A further object is to improve upon the effectiveness of standard rust-inhibitive lead pigments so as to secure the maximum in rust resistance from oil-type coating compositions. A further object is to produce red lead and other rust-inhibitive lead pigment paints which do not settle rapidly to a hard cake in the can, this improvement in settling being secured with no sacrifice in anticorrosive efficiency. A further object is to prepare highly effective primer coatings of outstanding flexibility and durability. A still further object of this invention is the manufacture of new and useful pigment compositions. Other objects will appear hereinafter.

Flake extended pigments have been used in small percentages in some types of compositions to lower cost, add bulk and in some cases to alter properties such as sanding. But the advantages disclosed herein of using large amounts of flake extender pigments in rust-inhibitive priming compositions have, however, not heretofore been recognized and insofar as we are aware no compositions of this kind have been prepared containing flake extender pigments in amounts which we have found to be effective for the purposes of the present invention. Flaked pigments other than extender pigments, such as aluminum, have of course been used alone for decorative and protective purposes.

We have discovered, as more fully pointed out hereinafter, that flake extenders, even when they possess the same chemical constitution as the non-flake extenders used for the prior art purposes mentioned above (as for instance fibrous magnesium silicate and china clay), when used in large amounts markedly improve instead of lower the degree of protection obtained from the standard rust-inhibitive pigments.

The term "flake extender" is used herein in the usual sense as referring to a non-metallic extender pigment in which two dimensions are considerably greater than the third. As is commonly understood, extender pigments are those substantially inert pigmenting materials having a refractive index so low that appreciable hiding power is not imparted to the paint film.

The above mentioned objects are accomplished by formulating paints comprising vehicle (preferably of the oil type) rust-inhibitive lead pigment and flake extender in an amount not less than 15% by volume of flake in the total paint solids. We prefer, as a rule, to use a pigment mixture containing at least 50% by volume of flake extender. Thus a preferred formulation comprises by volume about 65% vehicle, 20% flake extender, and 15% rust-inhibitive lead pigment.

The extender and rust-inhibitive pigments, if desired, may be previously blended for subsequent manufacture of the priming compositions. Blending may be accomplished by adding flake extender to the lead pigment at any convenient stage in its manufacture or by subsequent wet or dry mixing. It is important that the flake structure should not be destroyed by the method of mixing.

By "oil-type" vehicle we mean, in addition to the drying oils themselves, varnishes (i. e. heat-blended mixtures of resins and drying oils) and oil modified polyhydric alcohol-polycarboxylic acid resins. The film-forming ability of these additional vehicles is due in large part to oxidation of the drying oil acid radicals, thus making them closely related to the oils.

The metal protective paints which are improved by the present invention are those formulated with the lead pigments well known to the trade as being rust-inhibitors. Such pigments are red lead, blue lead, litharge, basic lead chromate, and highly leaded zinc oxides. By the term "highly leaded zinc oxide" we mean a pigment containing zinc oxide and not less than 20% by weight of lead compounds calculated as lead sulfate, and refer particularly to the commercial pigment known to the art as 35% leaded zinc oxide. All lead pigments are of course not rust-inhibitive. The anticorrosive qualities of the lead pigments mentioned above as compared to the non-inhibitive lead pigments, of which basic carbonate white lead is an example, have long been tabulated in the trade literature. The present invention is concerned with improved compositions comprising these known rust-inhibitive pigments and not with the disclosure of new pigments of this kind.

As previously indicated, the flake component should not be substantially less than the amount previously mentioned. When substantially smaller amounts are used, the effect produced by the flake is secondary in importance and relatively slight improvement is obtained over unmodified products. It is desirable to use still greater proportions of flake extender than the minimum mentioned above, but an important limiting condition is the loss of hiding power accompanying such use. Thus, in the majority of cases, 75% by volume of flake on the total pigment represents the practical maximum, this amount of flake corresponding to a minimum volume of 25% for the rust-inhibitive pigment when, for maximum effectiveness, no third pigment is present. In certain combinations, however, as much as 90% is useful to secure optimum results, in which case the remaining 10% must consist wholly of rust-inhibitive pigment. This improvement in rust-inhibitive effect by the presence of such relatively large amounts of the flake extender is quite unexpected in view of the fact that increase in the small proportions of non-flake extender which have been used for cheapening or increasing bulk markedly reduces corrosion resistance.

In order to obtain the maximum in anticorrosive efficiency, the unique pigment combinations described above should be used in a highly impermeable vehicle. For this reason the oil modified resins and oil varnishes rather than the oils themselves are preferred. The oil modified polyhydric alcohol-polycarboxylic acid resins are particularly effective because of their better durability characteristics, although the superiority of the flake extender mixture over corresponding straight rust-inhibitive pigments is evident in any type of vehicle.

The following examples illustrate the method of practicing our invention:

*Example I*

|  | Weight | Volume |
|---|---|---|
| Pigment: |  |  |
| Red lead | 75 | 49 |
| Flake talc (diameter 10–20 microns) | 25 | 51 |
|  | 100 | 100 |
| Vehicle ingredients: |  |  |
| Oil modified resin | 28.2 |  |
| Mineral spirits | 30.6 |  |
| Cobalt linoleate | 0.5 |  |
| Lead linoleate | 1.9 | 61.2 |
| Total |  | 161.2 |

The resin in the foregoing example is an oil modified polyhydric alcohol-polycarboxylic acid resin prepared by heating together in the usual manner 5.26 parts glycerol, 13.83 parts linseed oil acids, and 9.11 parts phthalic anhydride until the proper degree of resinification is secured (acid number about 3).

*Example II*

|  | Weight | Volume |
|---|---|---|
| Pigment: |  |  |
| Sublimed blue lead | 30 | 18 |
| Iron oxide | 25 | 21 |
| Flake Mica (diameter about 50 microns) | 45 | 61 |
|  | 100 | 100 |
| Vehicle ingredients: |  |  |
| Varnish gums | 11.53 |  |
| China-wood oil | 26.90 |  |
| Linseed oil | 13.41 |  |
| Mineral spirits | 51.85 |  |
| Cobalt linoleate | 0.1 | 103.79 |
| Total |  | 203.79 |

*Example III*

|  | Weight | Volume |
|---|---|---|
| Pigment: |  |  |
| 35% leaded zinc oxide | 20 | 13 |
| Iron oxide | 35 | 28 |
| Flake pyrophyllite (diameter 20–40 microns) | 45 | 59 |
|  | 100 | 100 |
| Vehicle ingredients: |  |  |
| Varnish gum | 6.0 |  |
| China-wood oil | 13.4 |  |
| Linseed oil | 22.4 |  |
| Mineral spirits | 55.6 |  |
| Cobalt linoleate | 0.4 |  |
| Lead linoleate | 2.2 | 100.0 |
| Total |  | 200.0 |

*Example IV*

|  | Weight | Volume |
|---|---|---|
| Pigment: |  |  |
| Basic lead chrome | 46 | 26 |
| Flake talc (diameter 10–20 microns) | 54 | 74 |
|  | 100 | 100 |
| Vehicle ingredients: |  |  |
| Linseed oil | 39.1 |  |
| Lead resinate | 1.5 |  |
| Manganese resinate | 1.0 |  |
| Mineral spirits | 12.0 | 53.6 |
| Total |  | 153.6 |

*Example V*

|  | Weight | Volume |
|---|---|---|
| Pigment: |  |  |
| Red lead | 30.0 | 15 |
| Basic lead chromate | 8.6 | 6 |
| 35% leaded zinc oxide | 11.3 | 9 |
| Iron oxide | 15.0 | 15 |
| Flake talc (diameter 10–20 microns) | 35.0 | 55 |
|  | 100.0 | 100 |
| Vehicle ingredients: |  |  |
| Oil modified resin | 46.7 |  |
| Mineral spirits | 38.8 |  |
| Lead linoleate | 2.4 |  |
| Cobalt linoleate | 0.4 | 88.3 |
| Total |  | 188.3 |

The resin in the example above is an oil modified polyhydric alcohol-polycarboxylic acid resin of the same composition as that in Example I.

Example VI

|  | Weight | Volume |
|---|---|---|
| Pigment: | | |
| Red lead | 20 | 9 |
| 35% leaded zinc oxide | 15 | 10 |
| Iron oxide | 25 | 23 |
| Flake talc (diameter 10-20 microns) | 40 | 58 |
|  | 100 | 100 |
| Vehicle ingredients: | | |
| Oil modified resin | 40.7 | |
| Mineral spirits | 43.9 | |
| Lead linoleate | 5.3 | |
| Cobalt linoleate | 0.2 | |
|  | 90.1 | |
| Total | 190.1 | |

The oil modified resin in Example VI is the same as that in Examples I and V.

It will be understood, from the presence of iron oxide in Examples II, III, V and VI above, that the composite pigment may contain other pigments in addition to the rust-inhibitive and flake pigments, it only being necessary that the latter two pigments be present in the amounts previously stated, i. e., 10% or more by volume of rust-inhibitive pigment and 50% or more by volume of flake pigment.

The flake extenders used in the practice of the present invention are the non-metallic flake extender pigments, examples of which are talc, pyrophyllite, and such micas as muscovite, paragonite and lepidolite. These materials furthermore have the optimum particle size of 4-50 microns in diameter and have a thickness of about one micron. The diameter and thickness of ordinary pigments are both in the neighborhood of one micron. Various natural and synthetic inorganic minerals which possess the requisite flaky physical structure may be used. Within the optimum particle diameter range of 4-50 microns, the range of 4-20 microns is particularly desirable in those cases in which film texture is critical. Smaller particles approach an approximately cubic or spheroid shape; larger sizes, ranging up to 150-200 microns, can be used but are less satisfactory.

The vehicle or binder for the compositions disclosed herein may be any of those used by the trade for compositions of similar type. These binders include resins, varnishes, and treated or untreated drying oils. Among the suitable drying oils are linseed oil, tung oil, soya bean oil, perilla oil, oiticica oil, safflower seed oil. Varnish resins for suitable varnishes include natural gums such as Congo, East India, Kauri, Manila, and Pontianac; synthetic gums include ester gum and the amberols as well as straight phenol-formaldehyde condensation products. Oil modified polyhydric alcohol-polycarboxylic acid resins based on the drying oils mentioned above are representative of suitable vehicles in this classification. Preferred vehicles are the oil modified polyhydric alcohol-polycarboxylic acid resins and phenol-formaldehyde resin varnishes containing 45-70% oil, the former being particularly valuable because of their superior durability characteristics. Other oil-gum varnishes containing 78-86% oil (45-75 gallon oil length) also give highly effective coatings. In this case the longer oil products are best obtained by blending a varnish with bodied oil, as moisture impermeability is thus retained to a higher degree. The longer oil products can also be made by blending the resin directly with the required amount of oil.

The total pigment volumes of the dried films, that is the total pigment volume based upon the total paint solids, from the compositions of Examples I, II, III, IV, V and VI are 37½%, 35%, 37%, 37½%, 33% and 37%, respectively. Total pigment volumes anywhere in the range of 20-50%, which corresponds to 80-50% by volume of vehicle in the total paint solids, are suitable for the practice of this invention, the preferred range being 25-40%. This minimum total pigment volume of 20% based upon the total paint solids corresponds to 2% of the rust-inhibitive pigment itself on the same basis since, as previously mentioned, the pigment mixture itself contains in minimum amount 10% of the rust-inhibitive pigment.

The rust-inhibitive coating compositions or paints of this invention may be prepared by any of the usual methods; for example, grinding of the vehicle with the pigment in a ball mill, colloid mill, or the like. Solvent and additional vehicle if desired may be added to the resultant mix in order to produce a paint of the desired consistency. Other methods known to the art may also be used.

Our improved compositions are used to most advantage as priming coats in metal protective finishing systems. They are adaptable not only to normal outdoor exposure conditions, as in the case of bridges, tanks, railway structures, etc., but also to the more severe corrosive conditions represented by underwater exposure, seashore and industrial (acid) atmospheres. They are designed primarily for the prevention of corrosion on ferrous metal surfaces, but need not necessarily be limited to this one type of metal, as they are also effective in protecting light weight alloys such as are used in airplane manufacture.

As an illustration of the superiority of our new primers over those of the prior art the following results of a four year outdoor exposure test may be cited: In this test steel panels were coated with one coat of primer and two coats of standard black topcoat. Each film system was of the same total thickness and thus directly comparable. Those panels on which a straight basic lead chromate primer (no extender of any kind) was used show serious rusting failure after four years. With a primer having an identical vehicle and total pigment volume, but in which two-thirds by volume of the lead chromate pigment had been replaced by talc, perfect protection has been obtained over the same period. When ordinary non-flaky inert extender of the same chemical constitution was used in place of talc, on the other hand, rusting occurred within less than three years.

A similar superiority of our flake extender rust-inhibitive pigment compositions under conditions of continuous water immersion (ship hulls, piers and docks, etc.) is indicated by their greater water excluding properties. In a direct test on the moisture impermeability of detached paint films it has been shown that a 100% increase in water impermeability can be obtained by replacing approximately three-quarters of the prime lead pigment in a paint with flake talc.

In addition to the above advantages in corrosion resistance, the flake extender pigment combinations described herein are characterized by good can stability in ready-mixed paints. Lead pigments alone tend to settle and cake hard in the can, and it is common practice to incorporate some fibrous extender to improve the settling properties, even at the expense of a certain degree of rust resistance (ordinary extenders invariably reduce the protective value of the prime pigment). Flake extenders, on the other hand, not only improve the protective properties of lead pigments, but due to their physical structure also prevent the characteristic hard caking of the latter.

Another advantage of this invention lies in the improved flexibility retention of primer films. With reactive lead pigments there is considerable embrittlement and hardening of the film, which renders it less adaptable to the expansion and contraction of the metal substrate under temperature changes. Flake extenders, however, do not harden and embrittle the film, and the net result of using a large proportion of such pigment to replace the usual lead products is to obtain a much more flexible and crack-resistant coating.

The present invention has also an important advantage from the standpoint of cost, as flake extenders are relatively inexpensive. When substituted for the heavy lead pigments on a volume basis, the savings in ingredient cost amount to a considerable proportion of the total. The ratio of unit volume costs for talc and red lead or basic lead chromate is, for example, approximately $\frac{1}{10}$ at present prices.

It will be seen from the foregoing that we have, by means of the invention described herein, brought about a remarkable improvement in rust-resistance over the standard red lead and other lead pigment paints, which are accepted by the art as representing most effective compositions for priming metal surfaces.

As many apparently widely different embodiments of this invention may be made without departing from the spirit and scope thereof, it is to be understood that we do not limit ourselves to the specific embodiments thereof except as defined in the appended claims.

We claim:

1. A metal-protective coating composition comprising 50% to 80% by volume of an oil type vehicle, rust-inhibitive lead pigment in amount of at least 2% by volume, and flake extender in amount not less than 15% by volume, all of said amounts being based upon the total paint solids.

2. A mixed pigment comprising at least 10% by volume of rust-inhibitive lead pigment and at least 50% by volume of flake extender.

3. The composition set forth in claim 1 in which the rust-inhibitive lead pigment is red lead.

4. The composition set forth in claim 1 in which the rust-inhibitive lead pigment is highly leaded zinc oxide.

5. The composition set forth in claim 1 in which the rust-inhibitive lead pigment is one which contains lead and oxygen only.

6. The coating composition set forth in claim 1 in which the vehicle is an oil-type vehicle and in which the particle size of the flake extender is 4 to 50 microns in diameter and about one micron in thickness.

7. The coating composition set forth in claim 1 in which said vehicle comprises an oil modified polyhydric alcohol-polycarboxylic acid resin.

8. The coating composition set forth in claim 1 in which said extender is flake talc.

9. A mixed pigment comprising at least 25% by volume of rust-inhibitive lead pigment and at least 50% by volume of flake extender.

10. The mixed pigment set forth in claim 2 in which the rust-inhibitive pigment is red lead.

11. The mixed pigment set forth in claim 2 in which the rust-inhibitive pigment is highly leaded zinc oxide.

12. The mixed pigment set forth in claim 2 in which the rust-inhibitive pigment is one which contains lead and oxygen only.

OSWALD H. GREAGER.
GORDON D. PATTERSON.